United States Patent [19]

Schindl et al.

[11] Patent Number: 4,818,085

[45] Date of Patent: Apr. 4, 1989

[54] MICROSCOPE HAVING AN EASILY REMOVABLE LAMP STRUCTURE

[75] Inventors: Klaus Schindl; Karl Moser, both of Vienna, Austria

[73] Assignee: Reichert-Jung Optische Werke A.G., Vienna, Austria

[21] Appl. No.: 88,781

[22] PCT Filed: Dec. 15, 1986

[86] PCT No.: PCT/EP86/00755

§ 371 Date: Aug. 4, 1987

§ 102(e) Date: Aug. 4, 1987

[30] Foreign Application Priority Data

Dec. 14, 1985 [DE] Fed. Rep. of Germany ....... 3544354

[51] Int. Cl.$^4$ .............................................. G02B 21/06
[52] U.S. Cl. ..................................... 350/528; 350/523
[58] Field of Search ............... 350/523, 528, 525, 526, 350/527; 439/208, 209, 211

[56] References Cited

U.S. PATENT DOCUMENTS

| 873,104 | 12/1907 | Stewart | 439/209 |
|---|---|---|---|
| 918,119 | 4/1909 | Boemper | 439/209 |
| 3,225,185 | 12/1965 | Bertolini et al. | 439/209 |
| 3,551,019 | 12/1970 | Michel | 350/18 |
| 4,148,552 | 4/1979 | Suzuki et al. | 350/523 |
| 4,210,384 | 7/1980 | Meyer et al. | 350/523 |
| 4,284,327 | 8/1981 | Kraft et al. | 350/523 |
| 4,538,879 | 9/1985 | Wagener | 439/211 |
| 4,619,503 | 10/1986 | Reinheimer et al. | 350/523 |

FOREIGN PATENT DOCUMENTS

465567 5/1937 United Kingdom ................ 350/525

Primary Examiner—Bruce Y. Arnold
Assistant Examiner—Terry S. Callaghan
Attorney, Agent, or Firm—Alan H. Spencer

[57] ABSTRACT

A microscope comprising a base portion (13), a cross member (15) and a vertical portion (14) connecting the base portion and cross member, at least one lamp (LA) for microscope illumination being arranged within the vertical portion, a slide adapted to be shifted in and out of the vertical portion from above in a substantially vertical direction holding at least one lamp. The slide is made of a material exhibiting good heat conducting properties and is formed with longitudinal ribs. The slide is arranged in a cavity extending in a substantially vertical direction and thermally insulated from the walls defining the cavity.

27 Claims, 10 Drawing Sheets

MICROSCOPE HAVING AN EASILY REMOVABLE LAMP STRUCTURE

BACKGROUND OF THE INVENTION

The invention relates to a microscope. The invention is in particular in the field of microscope illumination systems.

In known microscopes, the lamp unit arranged in the lower portion of the vertical portion of the microscope for transmitted light illumination is difficult to get access to from outside. When there is a break down in one of such lamps it is more than cumbersome and inconvenient to replace this lamp. This applies in particular to large research microscopes which are installed at stationary work stations with their backs to the wall and which might have ancillary equipment connected to them on either side of the vertical portion of the stand. What is more, in large microscopes the vertical portion thereof must be of particular stability. Therefore, bores, ports or other lateral openings which might facilitate an exchange of lamps should as far as possible be avoided.

BRIEF DESCRIPTION OF THE INVENTION

One object of the present invention is to provide a microscope in such a manner that the lamps of the microscope are easy and convenient to exchange. In the present context, the term "lamp" refers to the light source with associated reflector and/or associated socket means if the same are replaced as one unit, otherwise it denotes the light source as such.

In accordance with the present invention, a microscope comprising a base portion or base plate, a cross member and a vertical portion connecting said base portion and said cross member is proposed for establishing this object, wherein at least one lamp for microscope illumination is arranged within the vertical portion, a slide adapted to be shifted in and out of the vertical portion from above in substantially vertical direction holds at least one lamp. By such an arrangement, it is readily feasible to exchange the lamps of the microscope according to the present invention, because the vertical portion of the microscope stand is usually easily accessible from above. By such an arrangement of the lamp on an insertable and removable slide, it is furthermore possible to gain access to portions deep down in the microscope stand through an opening at the upper end of the vertical portion of the stand and to easily exchange the lamps. This possibility of exchanging lamps is particularly advantageous for microscopes operating in the transmitted light illumination mode which have the lamps arranged in the lower part of the vertical portion of the microscope stand.

According to a preferred embodiment of the present invention, heat dissipation means are provided adjacent the at least one lamp to prevent heat generated by the lamp from heating up parts of the microscope mechanism or of the microscope stand to such an extent that tensions and distortions occur resulting into inaccuracies disturbing the operation of the microscope, in particular in high magnification operations. To the same end, substantially vertically extending ribs are arranged adjacent at least one of the lamps, preferably on the slide as such, which slide is appropriately made of a material exhibiting good heat conducting properties, such as aluminium.

In a preferred variant of the invention, at least two lamps for different types of illumination, such as transmitted and incident light illumination, are successively arranged along the slide, such that these lamps are exactly adjusted to the appropriate optical path when the slide is in its inserted state, the centre points of the lamps appropriately lying on the longitudinal centre line of the slide or on a straight line extending parallel thereto.

In a further preferred embodiment of the invention, at least two lamps of the same type are successively arranged on the slide in longitudinal direction, one of said lamps being used in normal operation and the other one serving as replacement lamp. When one lamp fails, the slide then only need to be shifted by the distance the centre points of the two adjacent lamps are spaced apart from each other, which operation is facilitated by markings or latching means.

It was found particularly suitable for the slide to be provided with guide means along at least two diametrically opposed areas thereof, which facilitates insertion of the slide into a continuous or discontinuous pair of tracks provided in the vertical portion of the microscope stand. When the slide is designed symmetrically about the plane including said two opposed guide means, it is possible to orient and align successive lamps on the slide in opposite direction which permits easy replacement of lamps by turning the slide about its longitudinal central axis by 180° or by removing the slide and inserting it again after having it turned about the longitudinal axis by 180°.

The replacement of lamps is even more facilitated when the lamps successively arranged on the slide in longitudinal direction are oriented and aligned in the same direction, as, in this case, the slide only need to be lifted or lowered in order to move the next lamp into the desired optical path. In such an arrangement, it is appropriate that in each case two adjacent lamps successively arranged in longitudinal direction are spaced apart from one another by equal distance.

Instead of or in addition to the last-mentioned measure, latching means adapted to be brought into engagement with each other are appropriately provided at the slide and/or in the area where it is guided and supported, respectively, on the stand, which latching means are associated with predetermined locations of the at least one lamp, so that adjusting the individual lamps to the desired optical path may be easily effected also by untrained persons. Control of the shifting movement per se may be effected either manually or mechanically, which has, however, not been referred to herein in any more detail.

In a further particularly advantageous application of the invention, the slide is substantially symmetrical about a plane perpendicular to the slide's longitudinal axis. This permits, for example, in a microscope used for transmitted and incident light microscopy, to maintain operation of the microscope in the desired illumination mode even if the lamp effecting the illumination in the desired operation breaks down, since, due to the slide being removed, turned by 180° about the central axis in said plane of symmetry and inserted again, the lamp usually used in the other operation mode replaces the defective one and enables continuation of the desired operation mode until a new lamp replacing the defective lamp is available or the current examination is terminated When use is made of conventional lamps, it is particularly suitable to insert the light sources with the lamp socket means into the slide and to provide appropriate releasable mounts. When use is made of special-application lamps wherein only the actual light source is to be replaced, a variant is recommended wherein the sockets form an integral part of the slide which, moreover, adds to the heat transmission between socket and slide.

In another embodiment of the invention further facilitating the replacement of lamps, the slide includes plug-in connector components arranged to engage complementary plug-in connector components when the the slide is inserted in the vertical portion of the microscope stand, the power supply to the lamps being effected via said plug-in connector components and appropriate leads, which have, however, not been illustrated in every detail. When the slide comprises several lamps successively arranged thereon in longitudinal direction, it is appropriate for the plug-in connector components associated with the lamps successively arranged in longitudinal direction to be cascade-like offset from one another such that the plug-in connector components associated with the upper lamp and fixedly secured in the vertical portion of the microscope stand do not disturb the insertion of the slide and the plug-in connector components connected thereto and associated with the lower lamp.

In a variant of the invention, power to the lamps is supplied via at least one conductor rail arranged in the vertical portion of the microscope stand, which conductor rail may, for example, define the guide track for supporting the slide, at least one current consumer connected to the slide engaging the conductor rail when the slide is shifted in and out. In such an arrangement where the slide includes spare lamps serving to replace the one in operation and arranged below or above said operative lamp, it is particularly suitable when discrete non-conductive areas are distributed over the conductor rail. This may be accomplished, for example, by covering portions of the conductor rail with an insulating material. As a result, only that current consumer which supplies the lamp in operation is applied to the conductive area of the conductor rail, whereas the current consumer of the other lamp lies against the insulator in this working position, so that this lamp is automatically switched off.

In a further variant of the present invention, the slide is received in a cavity extending substantially in vertical direction and guided therein, said cavity communicating at its lower and upper end, respectively, with air inlet and air outlet ports, respectively, provided in the lower and upper portions, respectively, of the vertical portion of the microscope stand. This adds to the removal of heat from the lamp in operation and prevents heat from accumulating in the interior of the microscope stand. In a development of this embodiment, the cavity is provided with a substantially continuous wall at least on either side and the back thereof, which increases the stack effect. The slide is appropriately thermally insulated with respect to the cavity and/or the cavity with respect to the vertical portion of the microscope stand, so that no heat bridges can form. The light exit ports formed in the front of the cavity preferably include light-transmitting heat filters which, at the same time, may be so selected to filter out a desired spectral range for the illumination.

The present invention furthermore provides a microscope lamp mount adapted to be arranged in a lamp housing including electrical contacts, the lamp housing being arranged to be connected to a vertical support and the vertical portion of a microscope stand, respectively, extending upwardly from the microscope base. The microscope lamp mount comprises a heat conductive carrier, socket means for holding a lamp, said socket means being sustained on the carrier, heat dissipation means for conducting the heat from the carrier, and electrical means to connect the contacts to the lamp. The lamp housing may be integrally formed with the support. The heat dissipation means include a plurality of vertically aligned ribs which are preferably integrally formed with the carrier which preferably includes a second socket for holding a second lamp. The second socket is appropriately arranged adjacent the first socket such that there is a spare bulb provided on the carrier. In this microscope lamp holding arrangement, the electrical means may be so designed that they alternately supply power to the first and second lamp. According to a further embodiment, power is supplied simultaneously to both lamps by the electrical means.

In the following, the present invention will be explained in more detail with reference to the accompanying drawings.

DETAILED DESCRIPTION OF THE INVENTION

Figure 1:
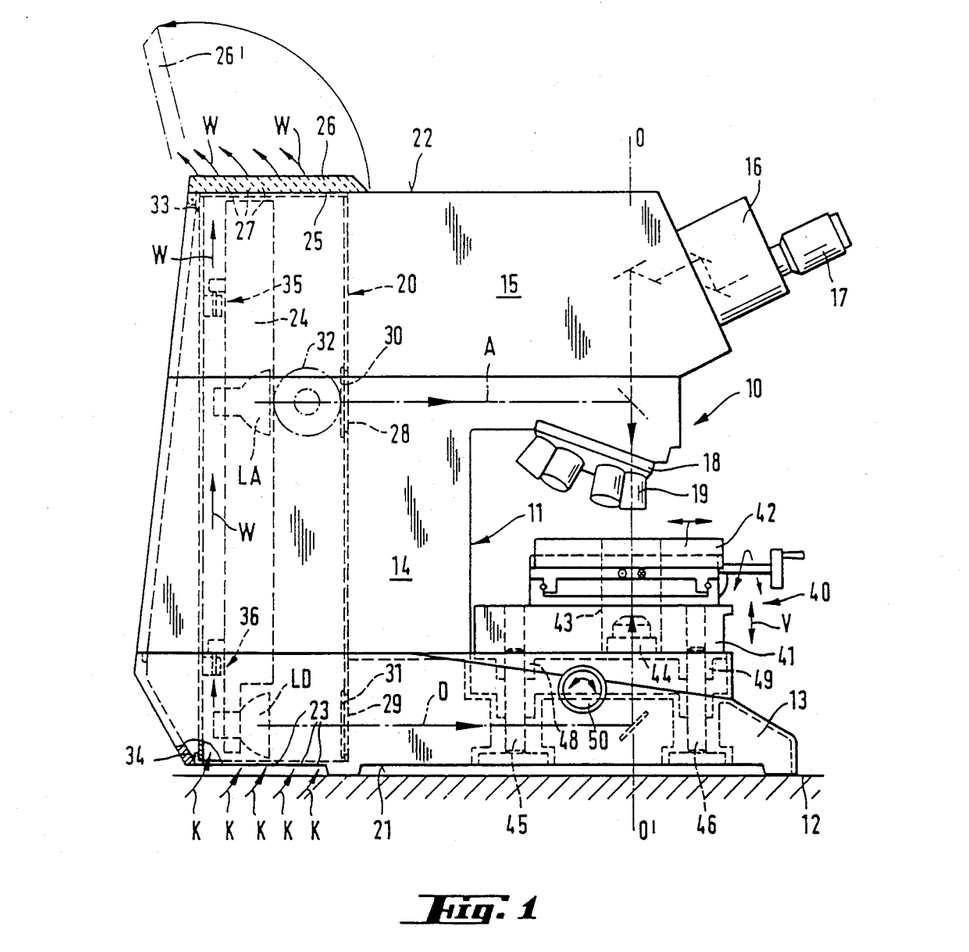
FIG. 1 is a side view of an embodiment of the microscope of the present invention.

FIG. 1 is a side view of a microscope 10 comprising a C-shaped stand 11 consisting of a base plate 13 extending substantially parallel to a suport surface 12, a vertical portion 14 and a cross member 15. A binocular housing 16 incorporating eyepieces 17 is attached to the front of the cross member 15. An objective turret 18 including a series of objectives having different magnifying powers is mounted to the underside of the cross member 15, objective 19 being in alignment with the optical axis 0—0' of the microscope when the system is positioned as shown in FIG. 1. A cavity 20 extends within the vertical portion 14 longitudinally of the the rear part thereof as indicated by dotted outline, which cavity may be, for example, of rectangular cross-section and extends from the lower end 21 to the upper end 22 of the microscope. Cooling air flows into cavity 20, as indicated by arrows K, through air inlet slits 23 proviced at the rearward portion of the lower end 21 of the microscope stand 11 for cooling the lamps of an illumination unit arranged within cavity 20. In the arrangement shown, the illumination unit includes a lamp LD for transmitted light illumination and a lamp LA for incident light illumination, both lamps being attached to a slide 24, which has only been schematically represented. The slide is adapted to be shifted in and out of cavity 20 through an opening 25 formed in the upper end 22 of the microscope which opening is arranged to be closed by means of a cover 26. Cover 26 includes obliquely extending lamellae defining openings 27 therebetween allowing the air heated up by lamps LA and LD, respectively, to escape at the top of cavity 20, as illustrated by arrows W.

At the front of cavity 20, there are exit ports 28, 29 provided through which the illumination beams emerge, the optical axis of the incident light illumination beam being marked with A and that of the transmitted light illumination beam with D. Heat absorption filters 30, 31 are inserted in ports 28, 29. Light may be additionally provided from the side via a prism (not shown), for example.

Cavity 20 assumes a fixed position in the vertical portion 14 of the stand, with intermediate heat insulating components indicated by reference numerals 33, 34 being provided for preventing heat from being transferred to the stand.

The slide 24 is mounted in cavity 20, with intermediate heat insulating means being likewise interposed, for example, in the form of the two plug-in connectors 35, 36 shown at the rear side of cavity 20 which are laterally offset from one another in order to enable slide 24 to be easily inserted into cavity 20 when cover 26 is open. Plug-in connectors 35, 36 may, at the same time, serve to effect power supply (not shown) to lamps LA and LD, which may, however, also be accomplished in a different manner, i.e. by way of a conductor rail.

As shown on the right-hand side of FIG. 1, an object stage 40 is positioned in the optical axis 0—0'. In the configuration shown in FIG. 1, said stage consists of a vertically shiftable stage carrier 41 and a mechanical stage 42 sustained thereon, the latter not forming part of the present invention.

In the area of the optical axis 0—0', a bore, indicated by reference numeral 43, extends through stage carrier 41 and mechanical stage 42. A condenser 44, which has not been represented in any more detail, can be attached to the lower end of said bore for transmitted light illumination. Stage 40 is supported on columns 45, 46 in a free-standing manner in front of vertical portion 14 of stand 11, which columns define guide means for the vertical shifting movement of stage 40. The lower ends of columns 45, 46 are held in the base plate 13 of stand 11. The upper ends of columns 45, 46 are embraced by cylindrical guide members 48, 49 arranged on the underside of stage carrier 41 and adapted to be shifted relative to columns 45, 46 therealong.

Drive means for vertical adjustment of stage 40 in the directions of arrow V are indicated by double-action control knob 50, which actuates stage 40 to be lifted and lowered in well-known manner when being turned clockwise or counterclockwise.

Figure 4:
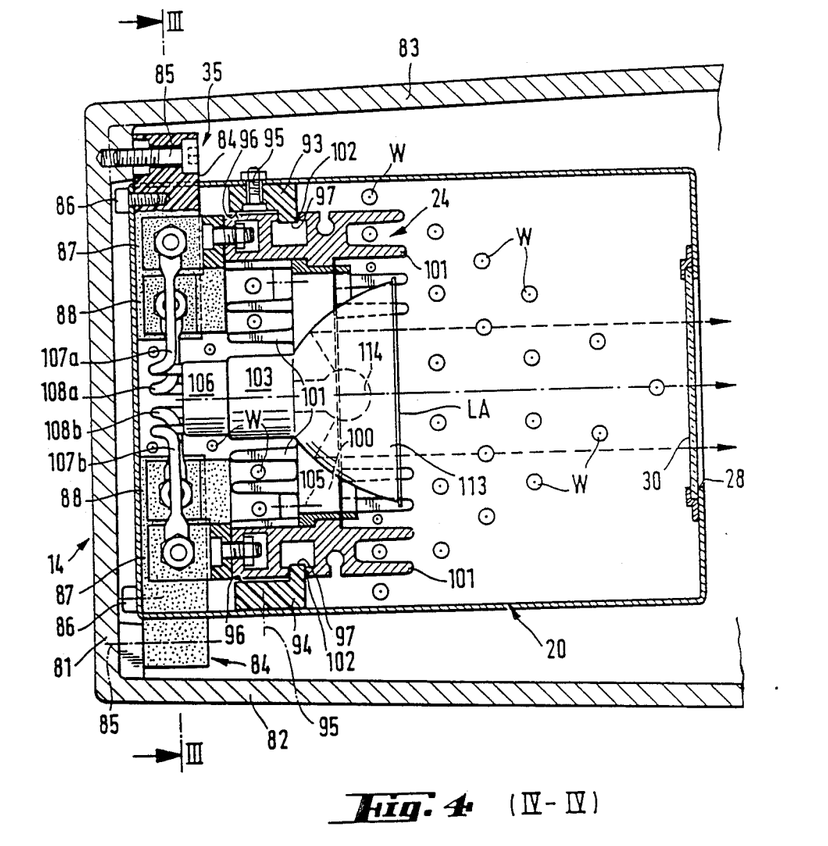
FIG. 4 shows a horizontal section along the plane IV—IV of FIG. 2 of the microscope portion shown therein.

FIGS. 2 to 6 show a preferred embodiment of a microscope designed according to the present invention. It will be noted that the vertically disposed cavity 20 is arranged in the vertical portion 14 of the microscope stand in the vicinity of rear wall 81 thereof and extends in close proximity to lateral walls 82, 83. Heat insulating components 33, 34 are provided in the upper or lower corner portion, or, as is apparent from FIGS. 3 and 4, small insulating blocks 84 which are, for one, secured to the rear wall 81 of the vertical portion 14 and, for the other, to the rear wall of cavity 20 by means of screws 85 and 86, respectively, are provided. In the shown configuration, blocks 84 engaging through the wall of cavity 20 are made use of in the interior of cavity 20 in that their inwardly projecting ends 87 and 88, respectively, serve to receive the female components 89, 90 of the plug-in connectors 35, 36 from which connecting wires 91a, 91b and 92a, 92b, respectively, lead to a power supply and intermediately disposed switching means in a manner which has not been depicted. It will be apparent, in particular from FIGS. 3 and 4, that projections 87 are shorter than projections 88, so that the female components 89 of the plug-in connectors are adjacent the side walls of cavity 20, whereas the female components 90 are cascade-like offset inwardly with respect to components 89, in order to enable the components of the respective plug-in connectors 35, 36 fixed to slide 24 may readily pass projections 87 when slide 24 is shifted in and out. Guide tracks 93, 94 made of a heat insulating material are attached to the side walls of cavity 20, as is best illustrated in FIG. 4, for example, by means of bolts 95. Said guide tracks extend in vertical direction longitudinally of the cavity walls and include inwardly directed guide faces 96 as well as protrusions 97 extending inwardly therefrom.

In the following, slide 24 will be described in more detail. Slide 24 consists of an elongated plate 100 made of a metal having good heat conducting properties such as aluminium, the front and reverse side of said plate being provided with a plurality of vertically aligned ribs 101, said ribs 101 being distributed on the back and front in such a manner that slide 24 is thermally stable and has a surface as large as possible. Vertically extending guide channels 102 are provided on either side of the slide into which protrusions 97 of guide tracks 93, 94 engage. Ribs 101 are interrupted in the areas of lamps LA and LD and an opening is formed in plate 100 for accommodation of the lamps. The lamps comprise a lamp base 103 with bores 104. The base is screwed to plate 100 via bores 104 in threaded bores provided for this purpose by means of screws 105. Said lamps furthermore comprise a connector plate 106 from which electric lines 107a, 107b and 108a, 108b, respectively, lead to the components of the plug-in connectors 35, 36 fixed to slide 24, which are indicated by reference numerals 35a and 36a in FIG. 5 and consist of thermally and electrically insulating blocks holding the male components 111 and 112, respectively, of the plug-in connectors. Finally, the lamps comprise a lamp shade or reflector 113 as well as a bulb 114. A handle hole 115 is provided at the top of slide 24 to facilitate insertion and removal of the slide into and from cavity 20.

Figures 5, 6:
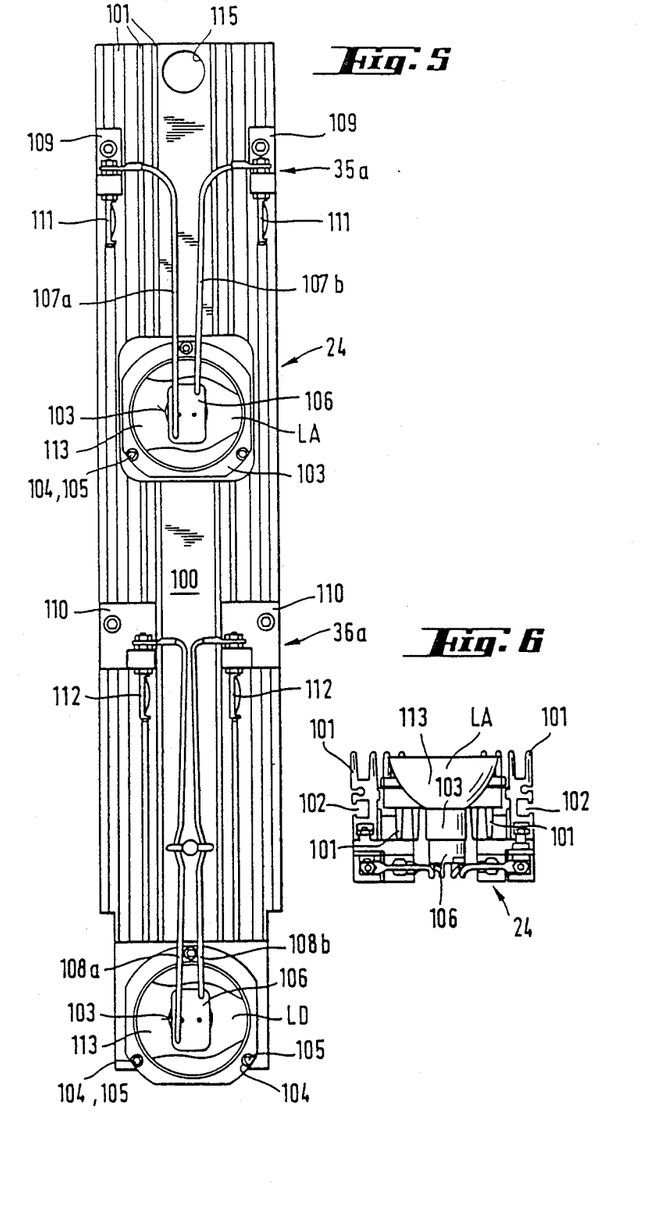
FIG. 5 is a view similar to FIG. 3, but proportionally reduced to show the complete slide.
FIG. 6 is a top plan view of the slide of FIG. 5.

When the slide is inserted into cavity 20, protrusions 97 of guide tracks 93, 94 engage into channels 102 of slide 24 and the male components 111 and 112, respectively, of the plug-in connectors are then automatically brought into engagement with the respective female components 89 and 90, so that the desired electrical contact is established. The disconnection from power supply is effected vice versa in corresponding manner when slide 24 is moved out.

Figure 2:
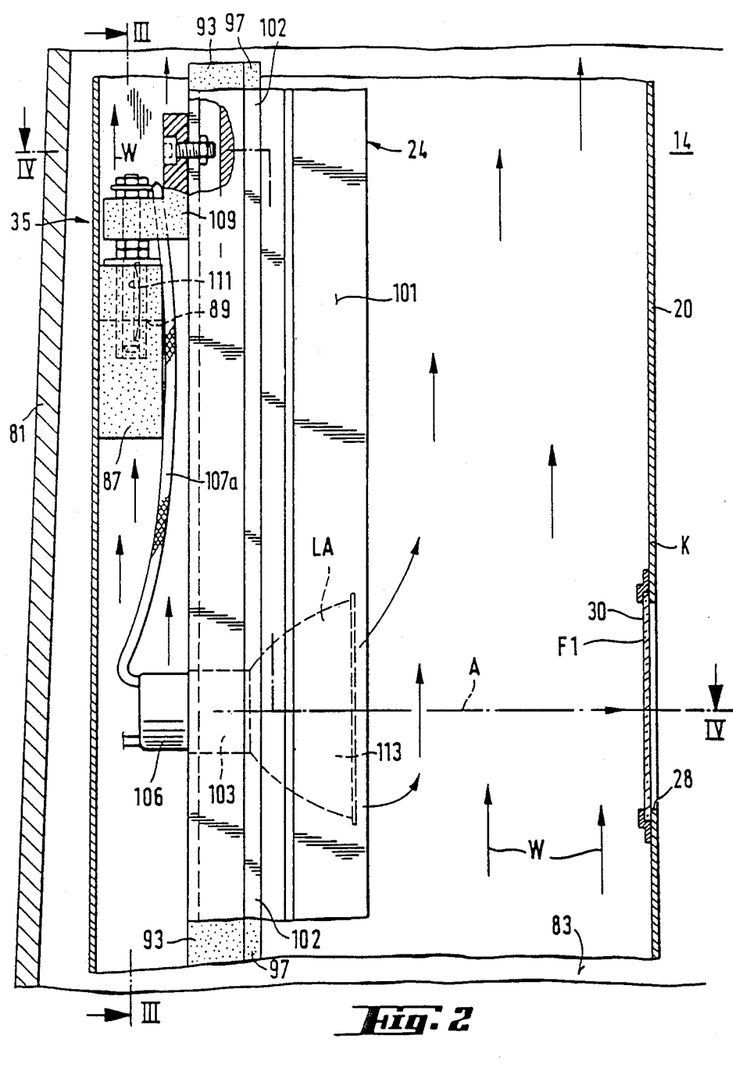
FIG. 2 shows a longitudinal section of a portion of the lamp mount and the attachment thereof within the vertical portion of the microscope stand.
Figure 3:
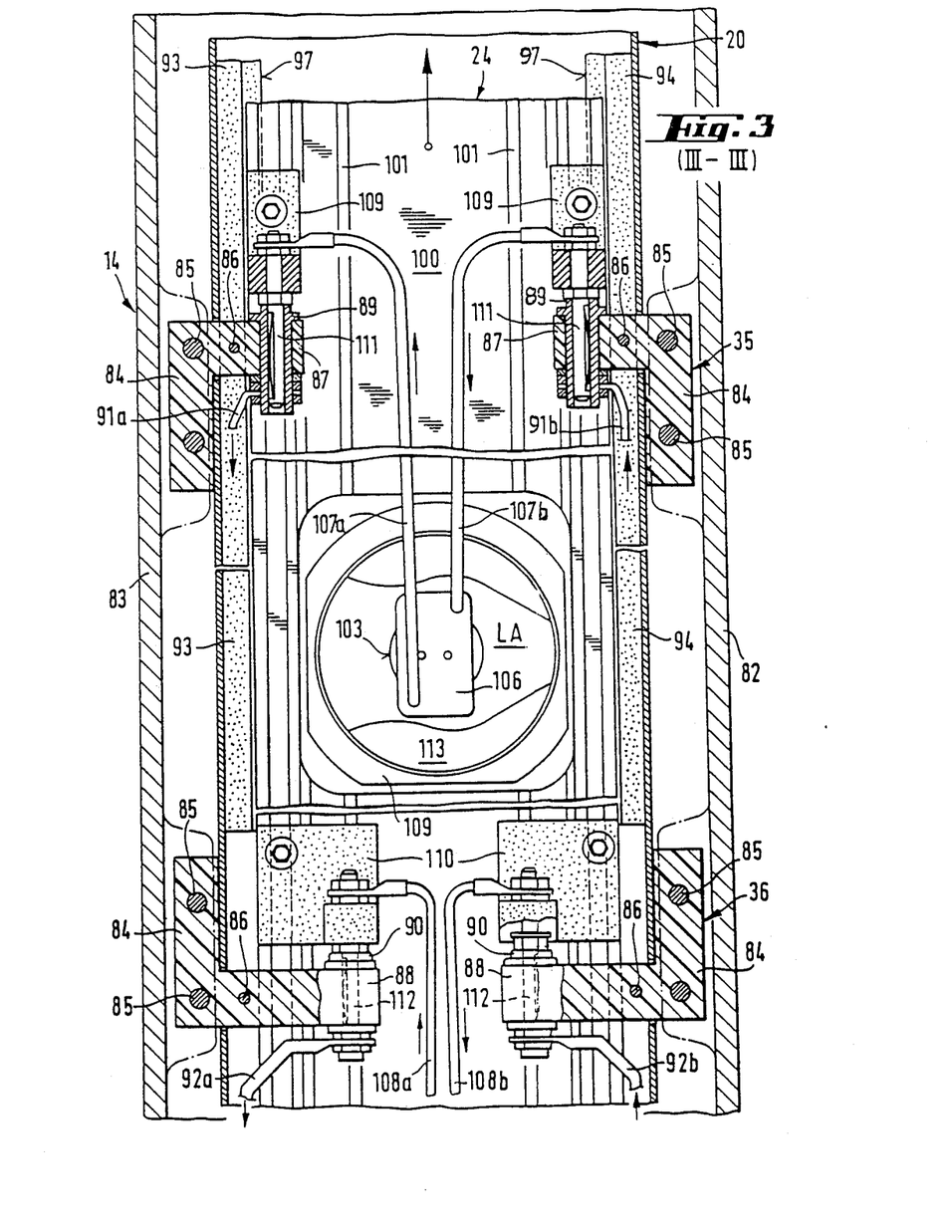
FIG. 3 shows a vertical section perpendicular to the sectional view of FIG. 2 along the plane III—III of FIG. 2.
Figure 7:
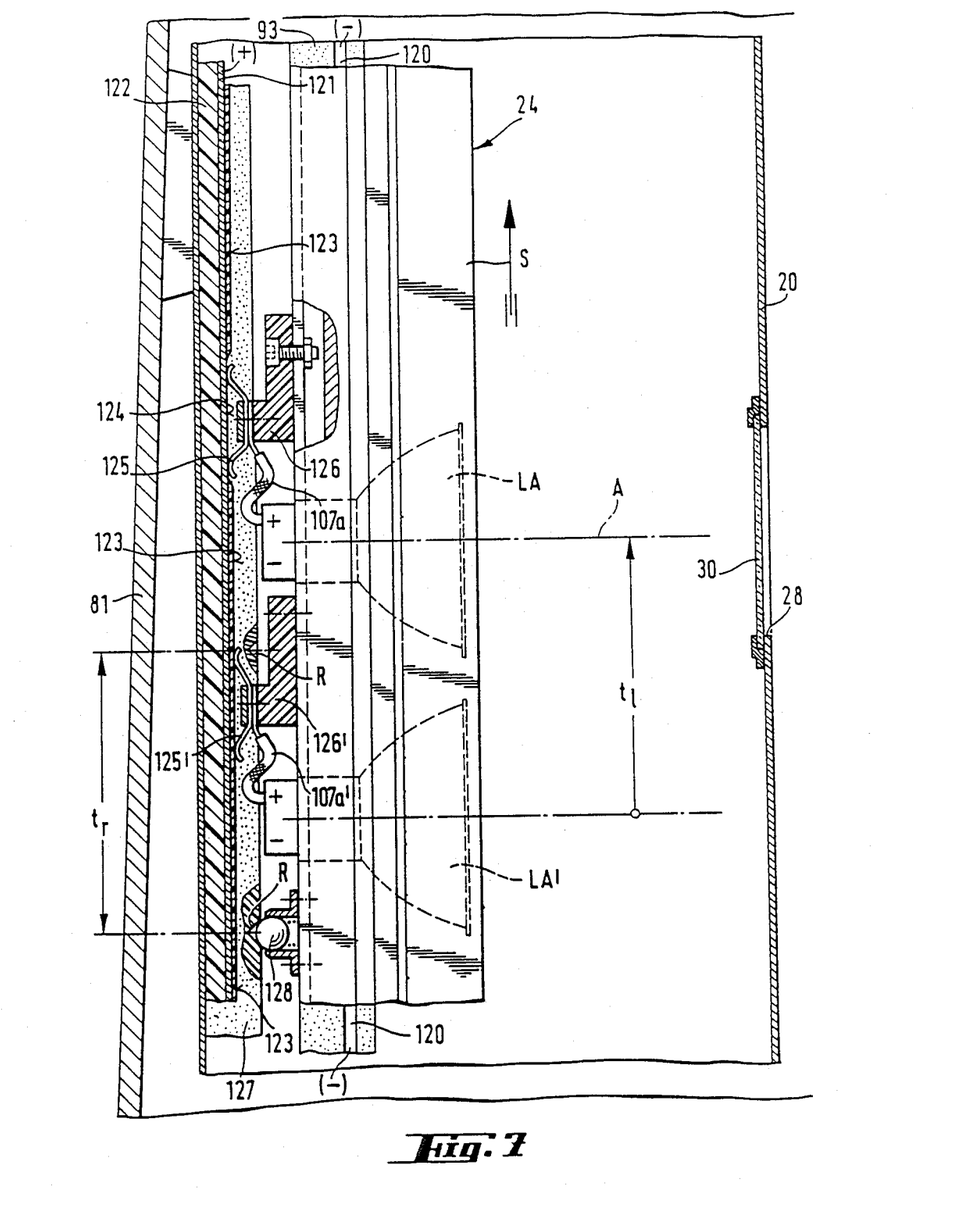
FIG. 7 shows a longitudinal vertical section similar to FIG. 2 of a variant of the illumination system wherein a spare lamp is arranged below the lamp effecting microscope illumination.

FIG. 7 is a detailed view similar to FIG. 2 of a variant of the illumination system wherein below lamp LA used in incident light illumination there is arranged an identical lamp LA' on slide 24. In this case, power is supplied via two conductor rails. One conductor rail 120, being connected to the minus pole of a voltage source in the shown configuration, is integrated in guide track 93, so that contact between conductor rail 21 and slide 24 is always maintained over the entire shifting range of slide 24 along track 93. Slide 24 is made of an electrically conductive material. The minus pole of the lamp is directly applied to slide 24. The second conductor rail 121 is arranged on the inside of the rear wall of cavity 20, a layer 122 of electrically insulating material being provided intermediate therebetween when the walls of cavity 20 are made of metal. An insulating layer 123 is applied over discrete portions of conductor rail 121 which is connected to the positive pole of the voltage supply, so that only that area of the conductor rail is uncovered which is indicated by reference numeral 124 in FIG. 7. The location of area 124 is so selected that a flexible sliding contact 125 connected to slide 24 via insulating intermediate piece 126 contacts this conducting area when lamp LA connected to the positive pole via line 107a is in its operative position, i.e. when its centre line is in alignment with the optical axis A for incident light illumination. The corresponding sliding contact 125' connected to slide 24 via insulating intermediate piece 126' and leading to the positive pole of lamp LA' via line 107a' then lies against insulator 123 so that only lamp LA burns when a voltage is applied to the conductor rails. If lamp LA is defective, slide 24 is shifted upward as indicated by arrow S, namely by the distance tl which corresponds to the space between the centre lines of lamps LA and LA'. This distance also corresponds to the distance which sliding contacts 125, 125' are spaced apart from one another on slide 24, so that, when the centre line of lamp LA' is in alignment with the optical axis A of the optical path for incident light illumination, sliding contact 125' comes into contact with the conducting area 124 of conductor rail 121, while sliding contact 125 lies against the portion of insulator 123 thereabove.

In order to accomplish exact adjustment of the lamps, latching holes R are provided in a further electrically insulating track 127 defining either part of the conductor rail or being disposed adjacent thereto, whose distance tr is equal to distance tl of the lamps' centre lines. Exact adjustment of lamps LA and LA' is accomplished due to a spring-loaded ball latch 128 snapping into latching engagement with holes R.

Figure 8:
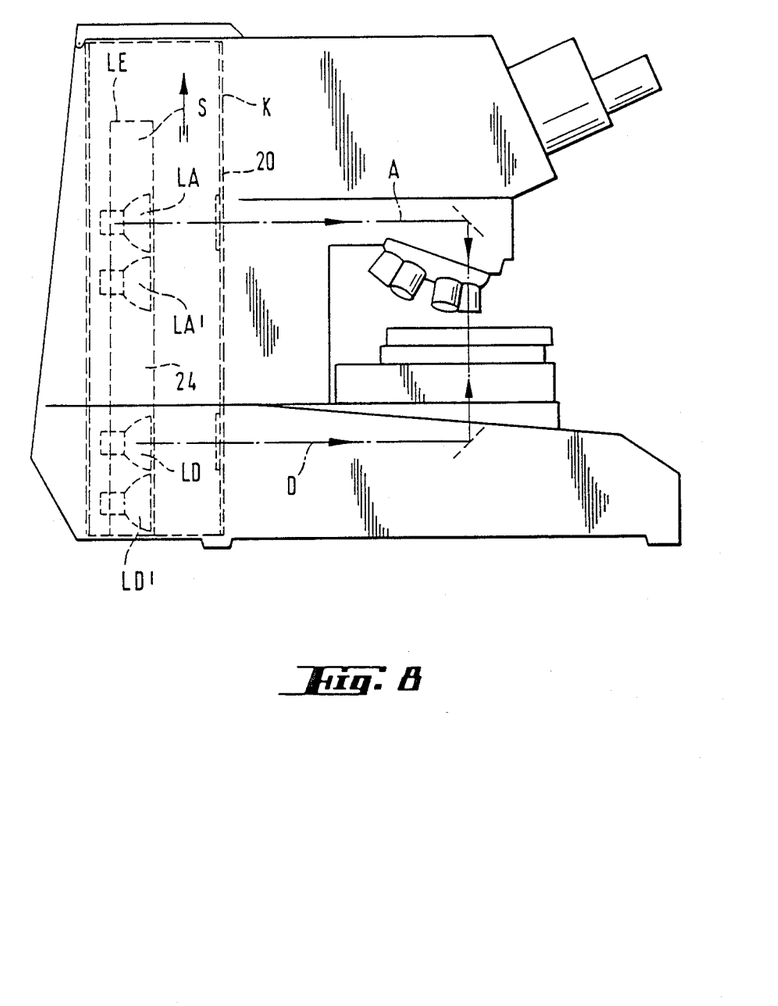
FIG. 8 schematically shows a variant of the illumination system comprising a spare lamp for incident light illumination as well as for transmitted light illumination.

In FIGS. 8 to 11 three variants are schematized wherein the lamps are easily to be replaced with the help of slide 24. In the arrangement of FIG. 8, there is provided a spare lamp LA' and LD' for either one of the two types of illumination, i.e. for lamp LA and LD, respectively, the spare lamps being arranged directly below the lamps used in normal operation. The spare lamps are moved into the optical path A and D, respectively, by lifting slide S.

Figure 9:
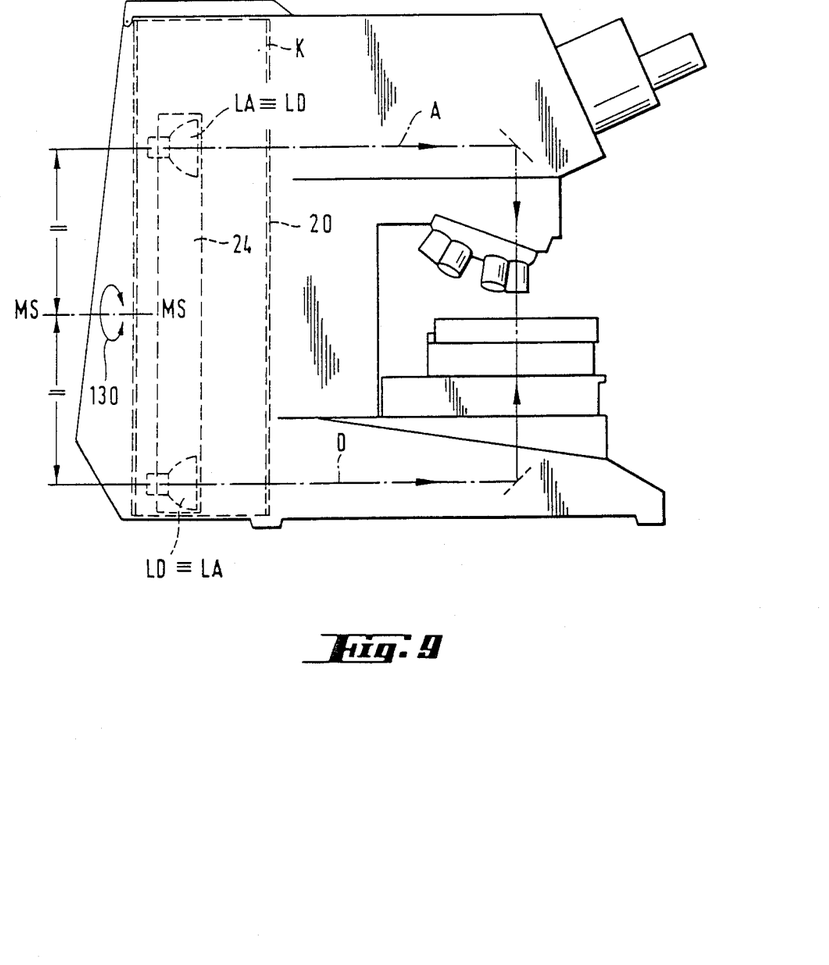
FIG. 9 is a schematic view similar to FIG. 8 of a variant wherein the lamp in operation can be replaced by turning the slide.

FIG. 9 shows a further variant wherein a slide 24 is arranged in cavity 20, with the same type of lamps LA and LD, respectively, being provided on either end of said slide. If one of the lamps for one of the two illumination types fails, slide 24 is completely removed and turned by 180° about its symmetric centre plane MS—MS as indicated by arrow 130 and subsequently inserted again, so that the intact lamp is now in the desired path of the defective lamp.

Figure 10:
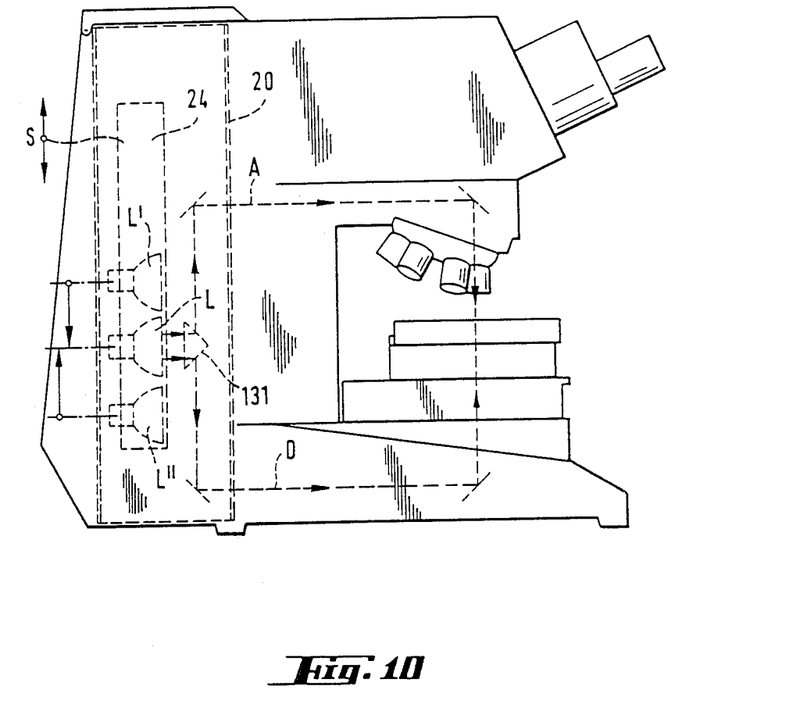
FIG. 10 shows a further arrangement wherein incident and transmitted light illumination can be effected by means of three different lamps movable into the optical path and arranged on the vertically shiftable slide.

FIG. 10 shows a further variant wherein both incident and transmitted light illumination is performed by means of a lamp L and a switch-over unit 131, one replacement lamp L' being disposed above lamp L and one replacement lamp L" below lamp L at pre-determined distances apart from each other, which, in the arrangement of FIG. 10, are equal. The replacement lamps may be of different type in order to meet different illumination requirements or they may be of the same type, if they are used for replacement purposes only.

Figure 11:
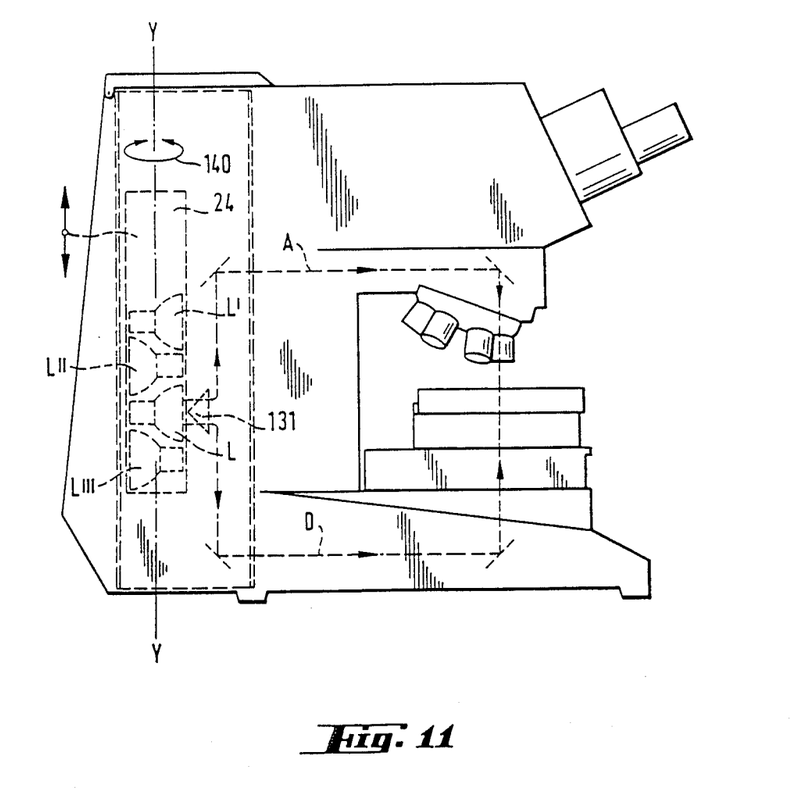
FIG. 11 shows a variant of the arrangement of FIG. 10 wherein the slide can be turned about the longitudinal axis and adjacent lamps are oriented in opposite directions.

The variant shown in FIG. 11 comprises a slide 24, the optical path of said variant corresponding to the one of the variant shown in FIG. 10. Slide 24 is turnable about its longitudinal axis L—L and includes two lamps L and L' which, when seen in the perspective of FIG. 11, are oriented and aligned to the right, and two lamps L" and L''' which are oriented and aligned to the left.

The foregoing description of specific embodiments of the present invention is given by way of illustration. It is self-evident that further advantageous embodiments and variants which may occur to the one skilled in the art from the present claims and pertinent description are likewise embraced by the invention.

We claim:

1. A microscope comprising a base portion, a cross member and a vertical portion connecting the base portion and cross member, at least one lamp for microscope illumination being arranged within the vertical portion, wherein a slide adapted to be shifted in and out of the vertical from above in a substantially vertical direction holds at least one lamp.

2. The microscope of claim 1, further including heat dissipation means adjacent at least one lamp.

3. The microscope of claim 1, wherein ribs extending in a substantially vertical direction are arranged adjacent at least one lamp.

4. The microscope of claim 3, wherein the ribs are integral with the slide.

5. The microsope of claim 3, wherein the slide is made of a material exhibiting good heat conducting properties.

6. The microscope of claim 1, wherein the slide is made of a material exhibiting good heat conducting properties and has longitudinal cooling ribs.

7. The microscope of claim 1, wherein at least two lamps are successively arranged on the slide in a longitudinal direction for different types of illumination.

8. The microscope of claim 7, wherein the lamps successively arranged in a longitudinal direction are oriented and aligned in the same direction.

9. The microscope of claim 1, wherein at least two lamps of the same type are successively arranged on said slide in a longitudinal direction.

10. The microscope of claim 9, wherein the lamps successively arranged in a longitudinal direction are oriented and aligned in the same direction.

11. The microscope of claim 9, wherein successively arranged lamps are oriented and aligned in opposite directions.

12. The microscope of claim 1, wherein the slide is provided with guide means along longitudinal portions thereof.

13. The microscope of claim 12, further including latching means for providing a defined location of at least one lamp.

14. The microscope of claim 1, wherein the slide includes plug-in connector components which, upon insertion of the slide into the vertical portion of the microscope stand, are adapted to cooperate with complementary plug-in connector components arranged within the vertical portion of the microscope stand, with power being supplied to the lamps via said plug-in connector components.

15. The microscope of claim 14 comprising a plurality of lamps successively arranged in a longitudinal direction, wherein the plug-in connector components associated with the lamps successively arranged in a longitudinal direction are offset from one another.

16. The microscope of claim 1, wherein power is supplied to the lamps via at least one conductor rail arranged in the vertical portion of the microscope stand, at least one current consumer being applied to the conductor rail when the slide is shifted in.

17. The microscope of claim 16, wherein the conductor rail has a non-conductive surface over discrete areas.

18. The microscope of claim 1, wherein the slide is received in a substantially vertically extending cavity, with air inlet and outlet means located, respectively, at the bottom and top of the vertical portion of the microscope stand for communication with said cavity.

19. The microscope of claim 18, wherein said cavity is partially defined by substantially lateral and rear walls.

20. The microscope of claim 18, wherein the slide is thermally insulated from the microscope.

21. A microscope lamp mount for use by insertion into the top of a vertically extending microscope lamp housing having vertical tracks and electrical contacts therein, which comprises an elongated carrier having longitudinal guides, said longitudinal guides being adapted to slidably engage the vertical tracks, first and second socket means mounted on said carrier for holding first and second lamps, each of said socket means having lamp contacts, means for dissipating heat from said carrier, and electrical means to connect said lamp contacts to the electrical contacts when said mount is positioned in the lamp housing.

22. A microscope lamp mount according to claim 21, wherein said electrical means connects the lamp contacts of said first and second sockets simultaneously.

23. A microscope lamp mount according to claim 21, wherein said electrical means connects the lamp contacts of said first and second sockets alternatively.

24. A microscope lamp mount according to claim 21, wherein said first and second sockets are mounted on the same side of said carrier.

25. A microscope lamp mount according to claim 24, wherein said electrical means connects the lamp contacts of said first and second sockets simultaneously.

26. A microscope lamp mount according to claim 24, wherein said electrical means connects the lamp contacts of said first and second sockets alternatively.

27. A microscope lamp mount according to claim 24, wherein said side is symmetrical about its longitudinal and transverse axes.

* * * * *